US006932299B2

(12) United States Patent
Beyerle et al.

(10) Patent No.: US 6,932,299 B2
(45) Date of Patent: Aug. 23, 2005

(54) APPARATUS FOR AERIAL REARMAMENT OF AIRCRAFT

(75) Inventors: John A. Beyerle, Oneida, NY (US); Gary L. Illingworth, Oswego, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/685,879

(22) Filed: Oct. 15, 2003

(65) Prior Publication Data

US 2005/0145752 A1     Jul. 7, 2005

(51) Int. Cl.$^7$ ................................................ B64D 1/00

(52) U.S. Cl. .................................................... 244/137.4

(58) Field of Search ............................. 244/137.4, 136

(56) References Cited

U.S. PATENT DOCUMENTS

| | | | | | |
|---|---|---|---|---|---|
| 3,122,056 | A | * | 2/1964 | Fitch et al. ................... | 89/1.51 |
| 3,167,278 | A | * | 1/1965 | Roberge ................... | 244/137.4 |
| 3,227,401 | A | * | 1/1966 | Currier ..................... | 244/137.4 |
| 3,242,808 | A | * | 3/1966 | Nelson et al. ............... | 89/1.51 |
| 3,653,614 | A | * | 4/1972 | Ruggeri ................... | 244/137.4 |
| 4,267,987 | A | * | 5/1981 | McDonnell ..................... | 244/2 |
| 5,188,313 | A | * | 2/1993 | Piasecki ......................... | 244/3 |
| 6,056,236 | A | * | 5/2000 | Weimer et al. ........... | 244/1 TD |

* cited by examiner

*Primary Examiner*—Tien Dinh
(74) *Attorney, Agent, or Firm*—Joseph A. Mancini

(57) ABSTRACT

The invention provides an apparatus for the aerial transfer of munitions from a rearming aircraft to the weapons pylon of the recipient combat aircraft. The invention also provides for the selection of munitions from a database of munitions and aircraft types in response to an Air Tasking Order. The invention allows a variety of combat aircraft to be adapted to aerial rearmament. The invention also provides for the release of precision guided munitions directly from a rearming aircraft so that orbiting combat aircraft can guide these munitions to the target by remote control.

15 Claims, 7 Drawing Sheets

Aerial Re-armament System

File  Cargo Acft  Ftr Acft  Munition  Mission #  Quantity  Call Sign  Date/Time  Help Open
Save
Save as...
Import...
Export...
Print C-130...
C-141...
C-17...
etc...

A-10...
F-14...
F-16...
F-22...
F-35...
etc

MK-82...
MK-84...
AGM-65...
GBU-12...
etc

0003
...

1  Cobra
2  Viper
3  Falcon
4  Warthog
5  ...

0704/1610

240

| Mission # | Cargo Acft | Fighter Acft | Munition | Quantity | Call Sign | Freq | Rendezvous Time |
|---|---|---|---|---|---|---|---|
| 0003 | C-141 | F-16 | Mk-82 | 2 | Cobra | 441.2 | 1610Z |
| 0004 | C-141 | A-10 | GBU-12 | 1 | Warthog | 341.5 | 1632Z |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

APPARATUS FOR AERIAL REARMAMENT OF AIRCRAFT

STATEMENT OF GOVERNMENT INTEREST

The invention described herein may be manufactured and used by or for the Government of the United States for governmental purposes without the payment of any royalty thereon.

BACKGROUND OF THE INVENTION

Technical Field of the Invention

This invention relates to the field of military aircraft munitions loading, specifically to the provision of a series of mechanical and electronic components collected and assembled to provide the means for loading munitions onto aircraft while in flight.

Shrinking defense budgets, combined with the increasing needs of the United States to project its military power often on short notice throughout the world, requires the armed forces to do more with less equipment and fewer personnel. Recently, as can be seen in the case of the war against Iraq, there has been a lack of consensus among allies forcing the United States to "go it alone" when prosecuting the war against terrorism. The nations of Europe, for example, lying closer as they do to areas of turmoil such as the Middle East, are often reluctant to take hard stances against terrorists who lie within an automobile ride from their borders. As can be seen most recently with Turkey during operation "Iraqi Freedom", nations are often reluctant to promptly provide forward operating locations or to grant flyover rights for United States military aircraft lest these nations seem to be associated too closely with United States military initiatives. The delays caused by these diplomatic barriers can seriously impact United States' combat operational planning.

What is needed therefore is a means to not only refuel U.S. military aircraft while in flight, so as to extend mission operational effectiveness, but also a means to continually reload the munitions which have been expended during combat operations without having to return to either a distant friendly nation's ground bases, or in the case of naval airpower, to a distant aircraft carrier, to obtain more munitions.

Military combat aircraft require both fuel and munitions to complete their assigned missions. While the re-fueling of combat aircraft can be accomplished either while on the ground or in the air, the loading of munitions has thus far been limited to the ground. Because of this, the weapons mounts currently found on the pylons of military combat aircraft are designed specifically to be 'single-shot' in function and they are re-serviced each time the aircraft lands and takes off. Additionally, aerial rearmament would benefit the extension of airframe serviceable life of combat aircraft which is otherwise degraded each time a combat aircraft's heavy wing loads are stressed during take off. With an aerial re-armament system, combat aircraft would no longer need to take off with any munition as they can all be loaded on the aircraft while in flight. Re-arming the aircraft while in flight would also offer added advantages in terms of military intelligence in that observers (spies) on the ground would not know where a combat aircraft's targets lie in terms of proximity to the ground base, nor what munitions would be employed against a target list. With aerial re-armament, surprise would be achieved and maintained throughout aerial combat operations.

What is needed therefore is a system for aerial re-armament of combat aircraft so as to enhance the response time, combat effectiveness, deployment options and reach of United States' combat air forces.

OBJECTS AND SUMMARY OF THE INVENTION

It is therefore an object of the present invention to provide an apparatus and method for aerial rearmament of combat aircraft.

One object of the present invention is to provide an apparatus which transfers munitions from a rearming aircraft to the weapons pylons of a combat aircraft while both aircraft are in flight.

Another object of the present invention is to provide an apparatus and method to automate the process of guiding the transfer of munitions from a rearming aircraft to the weapons pylons of a combat aircraft.

Yet another object of the present invention is to provide an apparatus to facilitate the adaptation of any combat aircraft's weapons pylons to munitions transferred from a rearming aircraft in flight.

Still another object of the present invention is to provide a method for storing in a database all combinations of munitions, rearmament aircraft and combat aircraft types and to configure such combinations in response to an Air Tasking Order (ATO).

Still yet another object of the present invention is to an apparatus by which the rearming aircraft can alternatively directly release munitions near a target wherein a combat aircraft would provide the guidance for the munition to the target.

The invention described herein provides an apparatus and method for rearming combat aircraft in-flight. Said invention comprises an apparatus for the aerial transfer munitions from a rearming aircraft to the weapons pylon of the recipient combat aircraft. Invention further comprises a method for the selection of munitions from a database of munitions and aircraft types in response to an Air Tasking Order. Invention further comprises an apparatus to adapt a variety of combat aircraft to aerial rearmament.

According to an embodiment of the present invention, apparatus for aerial rearmament of aircraft comprises a boom, where the boom is attachable to and extendible from a rearming aircraft; a weapons mount that is attachable to the aircraft which is to be rearmed and where the weapons mount is also capable of accepting a munition; and a weapons platform attached to the boom which is capable of positioning and orienting the munition for transfer from the boom to the weapons mount.

According to a feature of this embodiment of the present invention, apparatus for aerial rearmament of aircraft comprises means for providing aerodynamic lift to said boom.

According to another feature of this embodiment of the present invention, apparatus for aerial rearmament of aircraft comprises a first sensor mounted on the weapons platform and a second sensor mounted on the weapons mount, where the first sensor cooperates with the second sensor to assist in guiding the weapons platform to the weapons mount.

According to yet another feature of this embodiment of the present invention, apparatus for aerial rearmament of aircraft comprises an interactive computer program which comprises a means for selecting combinations of rearming aircraft, aircraft to be rearmed, and munitions; a means for storing and accessing these selected combinations in a database; a means for determining the quantity, availability, and compatibility of the rearming aircraft, the aircraft to be rearmed and the munitions; and a means for displaying the means for selecting, the means for storing and accessing, and the means for determining.

According to still another feature of this embodiment of the present invention, apparatus for aerial rearmament of aircraft comprises an interactive computer program which cooperates with a centralized database, where that centralized database may be either Air Tasking Order (ATO) or a Theater Battle Management Core System (TBMCS). Additionally, the interactive computer program may cooperate with the centralized database in real-time or non-real-time.

According to still yet another feature of this embodiment of the present invention, apparatus for aerial rearmament of aircraft comprises another interactive computer program which comprises a means for guiding the transfer of the munition from the rearming aircraft to the aircraft to be rearmed; a means for determining and indicating the spatial orientation of the munition during the transfer; and means for determining and indicating the status of the transferred munition. The means for guiding the transfer of the munition further comprises a means for displaying the relative orientation of the first sensor to said second sensor; and a means for the operator to correctly position the boom based on the displayed relative orientation. The means for determining and indicating the spatial orientation of the munition further comprises a means for determining and indicating the azimuth angle, elevation angle and yaw angle of the weapons platform and a means for determining and indicating the distance between the weapons platform to the weapons mount. The means for determining and indicating the status of the transferred munition further comprises a means for determining and indicating whether or not the munition is "docked;" a means for determining and indicating the whether or not the munition is "hooked;" and a means for determining and indicating the whether or not the munition is "armed."

Advantages and New Features

There are several advantages and new features of the present invention relative to the prior art. Important advantages include providing a method for striking strategic targets without regard to forward operating locations or airspace agreements; extending indefinitely the Close Air Support mission in support of forces on the ground; providing a fleet of "virtual" bombers without the cost or time involved in developing more aircraft that are specifically bombers in mission orientation. The invention thus fills the traditional void in airpower theory, that airpower cannot be effective in fighting the unconventional war against insurgents; using the present invention and an aerial task force, as soon as targets 'pop up' they can be hit immediately.

A related advantage stems from the fact that once the present invention has been deployed, the effective airframe life of combat fighter aircraft will be extended because they will not have to takeoff or land with heavy munitions loads on their wings. A new weapons mount designed for multiple loads, or multiple 'shots' facilitates such advantage and is part of the present invention.

BRIEF DESCRIPTION OF THE DRAWINGS

FIG. 5 depicts a computer screen display of an aerial rearmament system operator's interface.

DETAILED DESCRIPTION OF THE PREFERRED EMBODIMENT

Figure 1:
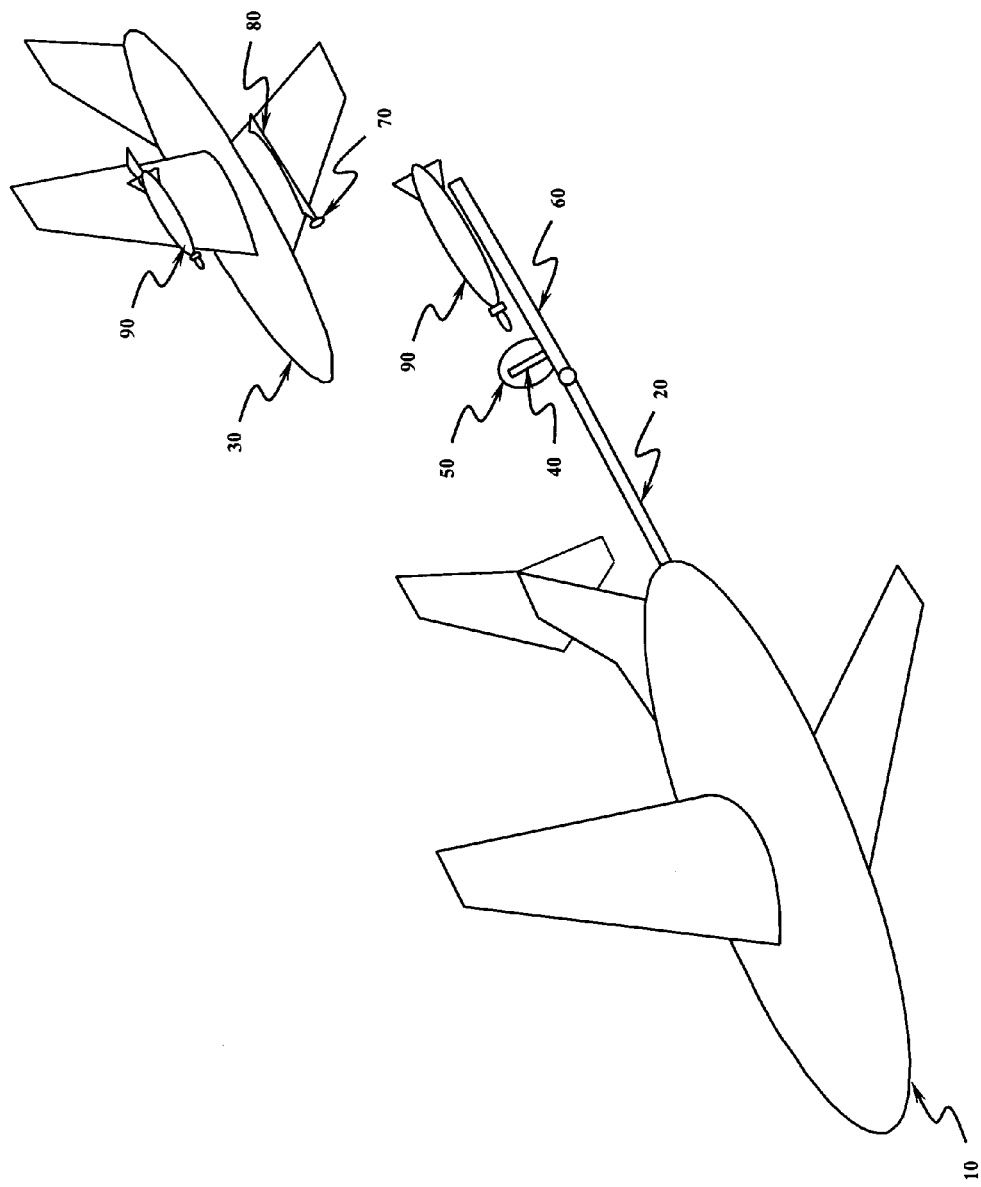
FIG. 1 depicts an aerial rearmament system as between a rearming aircraft and an aircraft being rearmed.

Referring to FIG. 1, apparatus for aerial rearmament comprises a boom 20, a first sensor 40, a Plexiglas faring 50 covering sensor 40, a weapons platform 60, a weapons mount 80 and a second sensor 70 located on weapons mount 80. A rearming aircraft 10, and a combat aircraft being rearmed 30 are likewise depicted. In this figure, boom 20 is depicted in its extended position. First sensor 40 is located on weapons platform 60 and protected from the slipstream by a transparent Plexiglas fairing 50. First sensor 40 is guided to second sensor 70, located on the leading edge of the weapons mount 80, located on the starboard wing pylon of the combat aircraft 30. By way of an example munition 90 a General Purpose Mark 82 bomb is shown already loaded onto the port wing of combat aircraft 30 while another is shown in position on weapons mount 80 for placement on the starboard wing.

Figure 2:
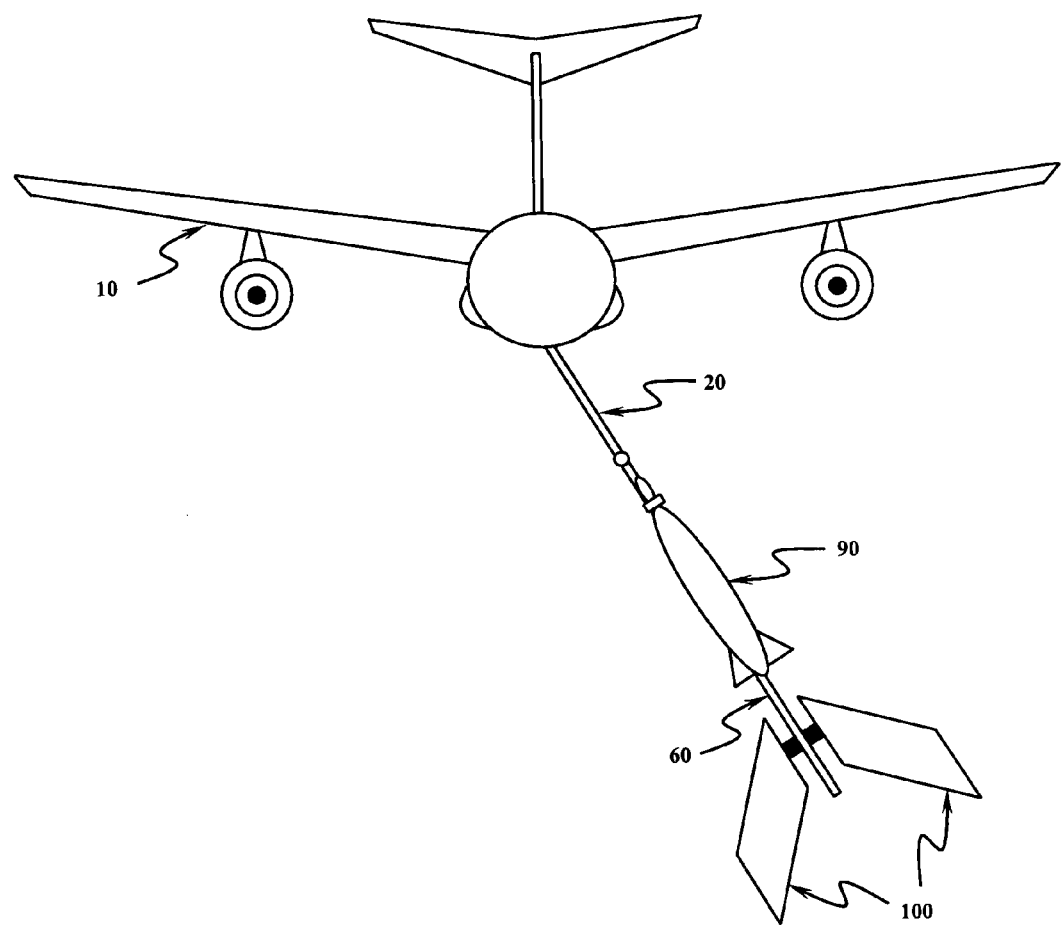
FIG. 2 depicts an aerial rearmament system associated with a rearming aircraft.

Referring to FIG. 2 depicting the perspective from a combat aircraft being rearmed 30 viewing toward rearming aircraft 10 with the boom 20 extended. Control surfaces, or 'elevons' 100 located on boom 20 provide both lift and guidance for boom 20. The weapons platform 60, and an example munition 90 in this example a General Purpose Mark 82 bomb resting on the weapons platform 60 is being delivered to the combat aircraft's 30 (see FIG. 1) weapons mount 80 (see FIG. 1).

Figure 3:
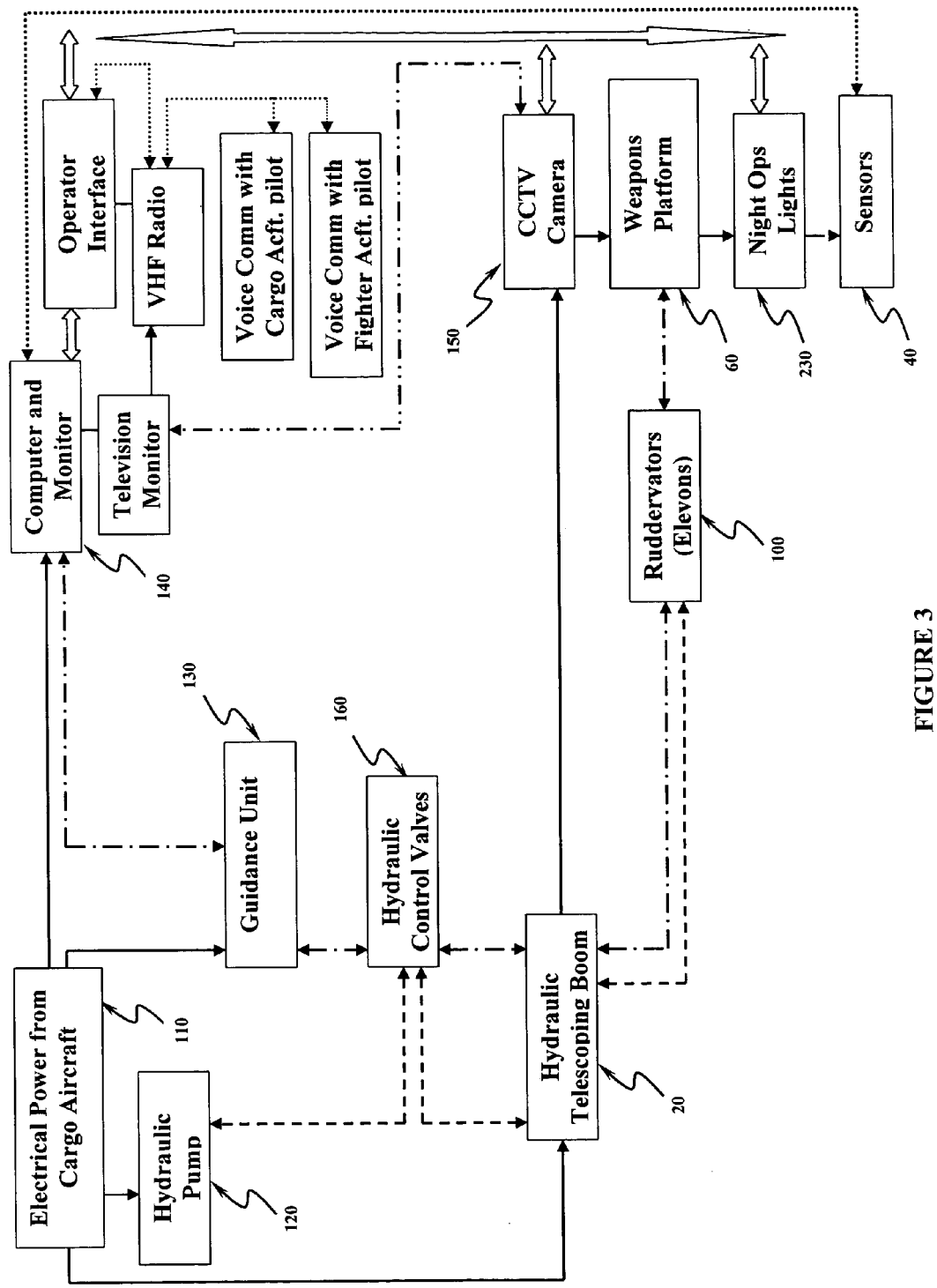
FIG. 3 depicts a block diagram of the components comprising an aerial rearmament system and their interconnections.

Referring to FIG. 3, an electrical power source 110 from the rearming aircraft 10 provides power for the hydraulic pump 120, the guidance unit 130, the computer and monitor 140, a closed circuit television (CCTV) camera 150, and sensors 40 located on the weapons platform 60 at the end of the boom 20.

Hydraulic power is provided through hydraulic control valves 160 to the boom 20, and through the boom 20 to the elevons 100 which act as control surfaces to provide lift and maneuverability to the boom 20 when extended into the slipstream behind the rearming aircraft 10.

Data in the form of guidance instructions are provided by the computer 140, to and from the guidance unit 130, the hydraulic control valves 160, the elevons 100, and the weapons platform 60.

Data from sensors 40 located on the weapons platform 60 at the end of the boom 20 is transmitted to the computer 140 where it is monitored by the computer guidance software and the human operator. This sensor data is then interpolated into guidance instructions and sent to the guidance unit 130, continually refreshing the position of the boom 20 and weapons platform 60 in relation to the position of both the combat aircraft 30 and the rearming aircraft 10. Data on the precise location of the boom 20 and the munition 90 located on the weapons platform 60 is provided by additional sensors 70 located on the weapons mount 80 of the combat aircraft 30.

A closed circuit television (CCTV) camera 150 located on the weapons platform 60 at the end of the boom 20 allows the human operator to adjust the camera 150 if necessary to visually monitor the process. Night operations lights 230, also located on the weapons platform 60, illuminate the area of activity and allow the human operator to similarly monitor the process visually during darkness.

Figure 4:
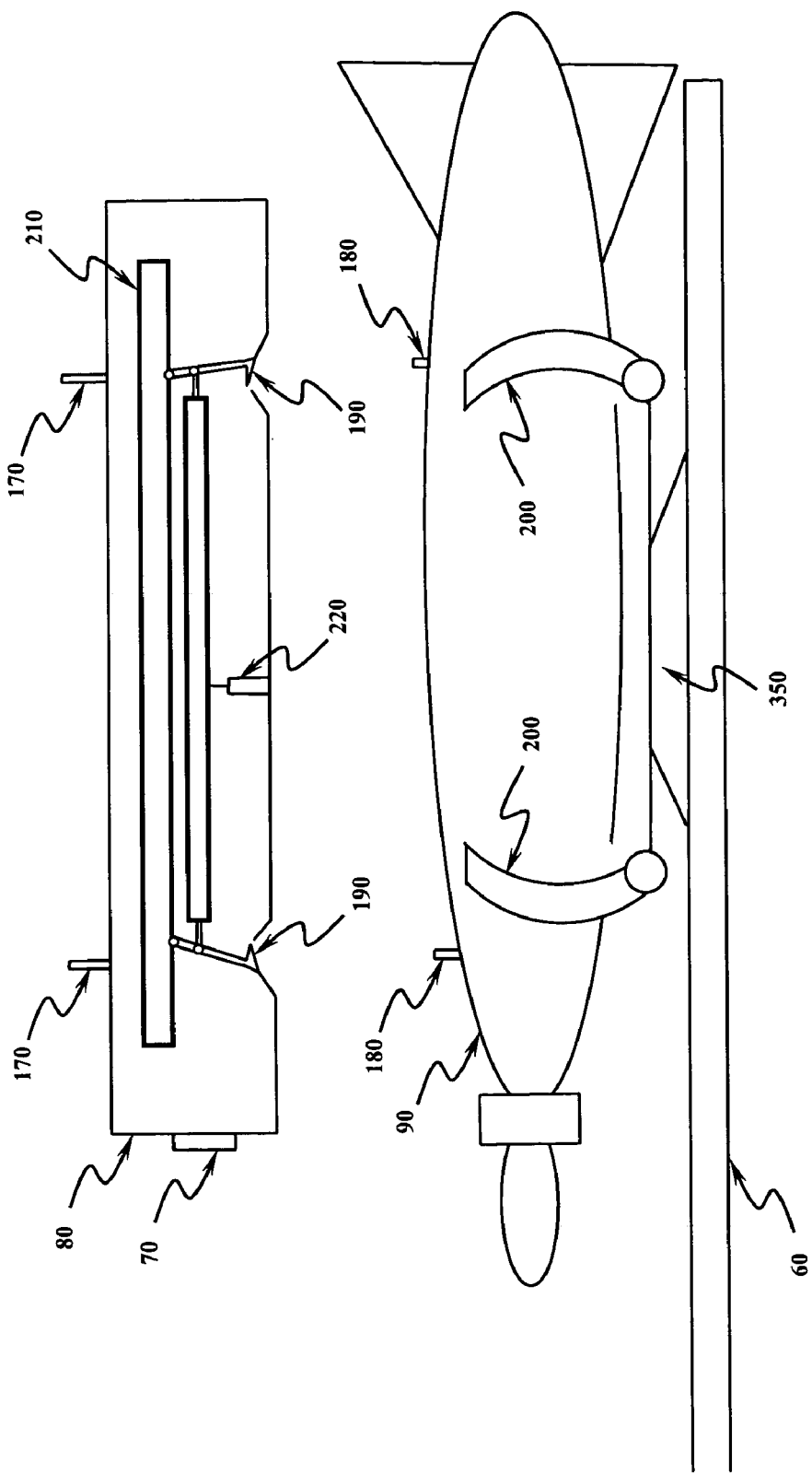
FIG. 4 depicts a munition as it relates to an aircraft weapons pylon of an aerial rearmament system.

Referring to FIG. 4, boom 20 (see FIGS. 1 and 2) is telescopically extended outward from the rear of the rearming aircraft 10 (see FIGS. 1 and 2). Boom 20 is guided by sensors 40 (see FIG. 1) and the computer 140 (see FIG. 3) on the rearming aircraft 10 toward the weapons mount 80 located on the pylon of the combat aircraft 30. Weapons mount 80 is fixed to the pylon by ground crew while the combat aircraft 30 is on the ground through the use of a first pair of standard mounting loops 170. Once the weapons mount 80 is fixed on the combat aircraft 30 pylon, all other munitions 90 loading can be accomplished while the combat aircraft 30 is airborne.

A second pair of standard loops 180 are located in tandem on the top surface of the weapon 90 and are forced upward with the motion of the boom 20 until the loops 180 engage the hooks 190 on the weapons mount 80. Any slight variations in movement necessary to perform this part of the process are facilitated by the articulating pivoting cradle 350 located on the weapons platform 60. Until the second pair of standard loops 180 on the munition 90 are fully engaged to the hooks 190 on the weapon mount 80 of the combat aircraft 30, the weapon 90 is held to the weapons platform 60 and the boom 20 through clamping action provided by a set of calipers 200 which open by computer control once electronic and visual verification of attachment is achieved by the human operator.

During attack runs on the target, the combat aircraft pilot releases the munition 90 in the normal way; when he does this, the repeating gas canister gun 210 fires its round (similar to an eight-gauge shotgun shell) which forces the hooks 190 open and simultaneously forces an assisting plunger 220 downward, pushing the munition 90 away from the weapons mount 80 and towards its target on the ground.

Referring to FIG. 5, a computer screenshot is shown which depicts some of the facets of the present invention aerial rearmament system as it might be implemented within a typical Unix-based Command and Control system such as the Theater Battle Management Core System (TBMCS). In this screenshot, all items along the top Tool Bar 240 have their drop down menus visible. In actual operation, each of these drop down menus is collapsed until desired by clicking on it with a mouse or other pointing device. In preparation for the aerial rearmament mission, the human operator selects one item from each of the drop down menus, filling out the online form which then constitutes a database. Each item selected is then inserted into the database file 250, which is saved with a unique name. This information then becomes part of the Air Tasking Order (ATO) within the TBMCS. When the operator reopens this database file 250, all the information needed to complete the aerial rearmament mission is available at a glance to the human operator. This database file 250 can either be filled out on the ground before the mission(s), and then either transmitted up to the rearmament aircraft electronically, or loaded into the rearmament aircraft's computer on a floppy disk or other mechanical means, or filled out by the human operator on the rearmament aircraft while in flight and transmitted to the command and control facility located on the ground. Each time a rearmament mission is completed, the remaining available inventory of munitions stores located on the rearmament aircraft is updated in the database and reported to Command and Control personnel on the ground.

Figure 6:
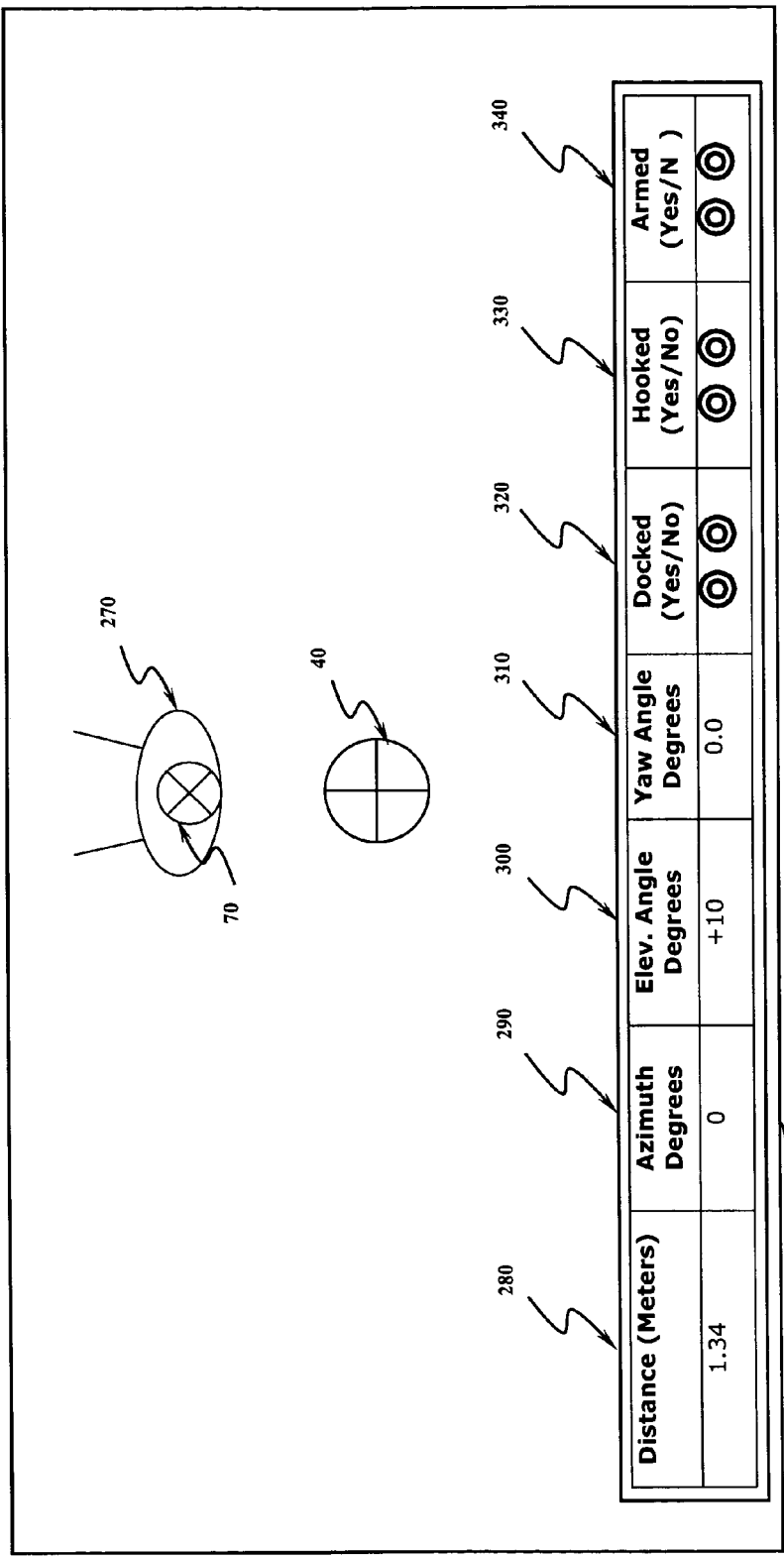
FIG. 6 depicts a computer screen display showing rearming boom guidance for an aerial rearmament system.

Referring to FIG. 6, a computer screen shot 260 depicts the computer software indicating guidance progress of the boom 20 (see FIGS. 1 and 2) and the munition 90 (see FIGS. 1, 2 and 3) to be loaded onto the combat aircraft. The physical location of the first sensor 40 located on the end of the telescoping boom 20 is depicted in relation to its position with respect to the second sensor 70 (see FIGS. 1 and 4) located on the front of the weapons mount 80 (see FIGS. 1 and 4) which is attached to the appropriate pylon 270 of the combat aircraft 30 (see FIG. 1).

The distance indication 280 (in meters) of the first sensor 40 (i.e., located on the end of the boom 20) is calculated by the guidance software. In a like manner, the azimuth 290 (in degrees) of the weapons platform 60, elevation angle 300 (in degrees), and yaw angle 310 (in degrees) are updated and shown in their respective boxes. When the weapons platform 60 reaches its correct position under the weapons mount 80 it is said to be 'docked,' and this condition is then depicted on the display as a green light 320 in the "Docked Yes/No". Until the docked condition is achieved, a red indicator light 320 remains illuminated.

The munition 90 only remains in the docked position momentarily, then it is raised slightly to engage its standard loops 180 (see FIG. 4) into the two 'L' shaped hooks 190 (see FIG. 4) located in tandem in the weapons mount. These loops are in standard locations on every munition regardless of type. When the "hooked condition" exists, a green light 330 is illuminated. Prior to this condition a red light 330 is lit.

The last procedure is the arming state of the munition. An "armed state" is indicated by a green light 340, which remains illuminated with a red light 340 until armed.

Figure 7:
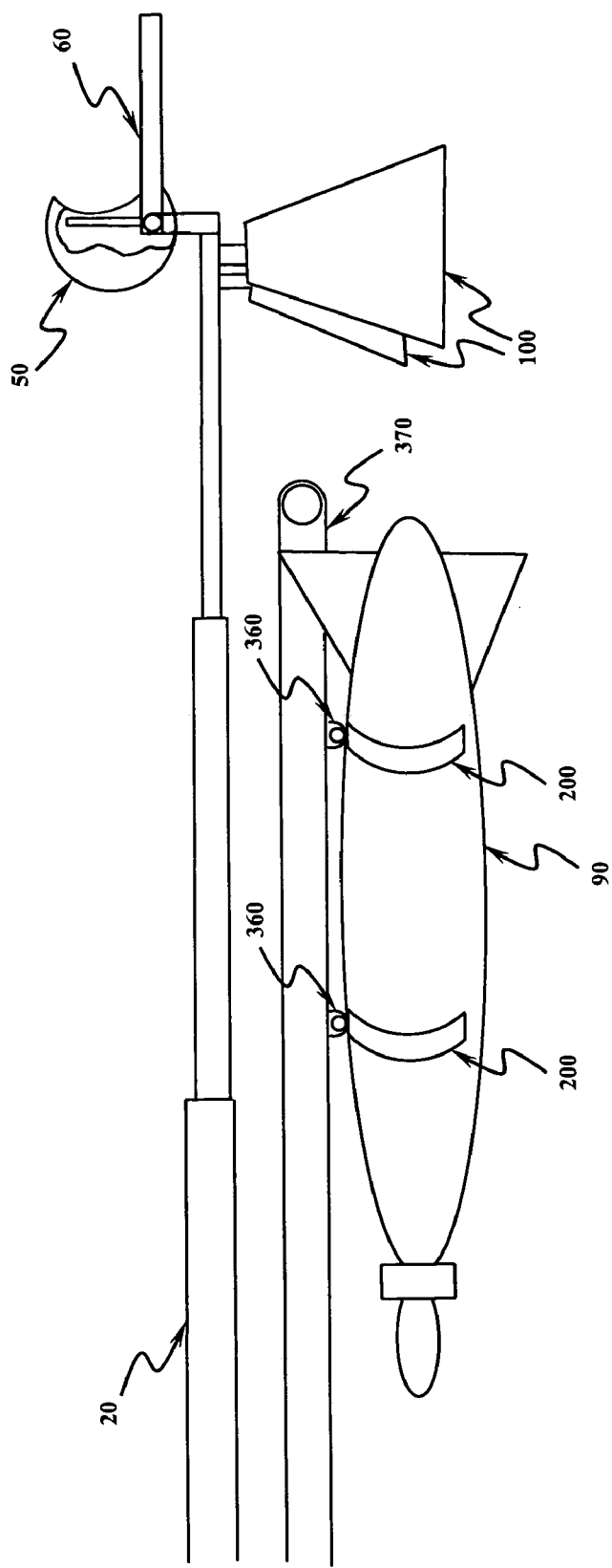
FIG. 7 depicts both a munition as it relates to an aerial rearming boom, and features of the aerial rearming boom.

Referring to FIG. 7, the present invention is depicted in an additional role directly dropping munitions 90 (such as the Guided Bomb Units (GBUs) shown) from the boom 20 while extended through the rear of a rearming aircraft 10 (see FIGS. 1 and 2) such as a C-141, C-130, or C-17 etc. The extended boom 20, together with elevons 100, weapons platform 60, and protective fairing 50 are shown. An endless conveying system 370 is attached underneath the boom 20, which allows munitions 90 to be conveyed rearward and then released. Once released, the calipers 200 and sway braces 360 which hold the munition 90 to the endless conveying system 370 temporarily until release continue their progress on the conveyor returning to their starting position inside the rearming aircraft 10 in the munitions build area, where another munition 90 can be built and conveyed.

While the preferred embodiments of the invention have been particularly described in the specification and illustrated in the drawing, it should be understood that the invention is not so limited. Many modifications, equivalents, and adaptations of the invention will become apparent to those skilled in the art without departing from the spirit and scope of the invention as defined in the appended claims.

What is claimed is:

1. Apparatus for aerial rearmament of aircraft, comprising:
    a boom, said boom being attachable to and extendible from a rearming aircraft;
    a weapons mount, said weapons mount being attachable to an aircraft which is to be rearmed;
        said weapons mount being capable of accepting a munition;

a weapons platform, said weapons platform being attached to said boom, said weapons platform being capable of positioning and orienting said munition for transfer from said boom to said weapons mount; and means for providing aerodynamic lift to said boom.

2. Apparatus as in claim 1 further comprising:

a first sensor mounted on said weapons platform; and a second sensor mounted on said weapons mount;

wherein said first sensor cooperates with said second sensor so as to assist in guiding said weapons platform to said weapons mount.

3. Weapons mount as in claim 1, further comprising:

a plurality of hooks for engaging loops on said munition;

means for simultaneously forcing open said hooks so as to disengage said plurality of hooks from said loops and release said munition; and a plunger for forcing said munition downward and away from said weapons mount immediately upon release.

4. Weapons platform as in claim 1, further comprising:

a movable cradle to provide said positioning and said orienting of said munition; and a plurality of calipers for holding said munition to said movable cradle.

5. Apparatus of claim 2, further comprising:

a computer and monitor;

a CCTV camera and television monitor;

a guidance unit;

an electrical power source;

a hydraulic pump; and a plurality of hydraulic control valves, wherein:

said computer receives and processes data generated by said first sensor and said second sensor;

said computer further generates and forwards instructions from said processed data to said guidance unit;

said guidance unit actuates said plurality of hydraulic control valves so as to cause hydraulic pressure from said hydraulic pump to effectuate positioning of said boom; and said CCTV camera captures an image of said positioning and said orienting of said munition being transferred from said boom to said weapons mount and displays said captured image on said television monitor.

6. Apparatus of claim 5, further comprising:

a first interactive computer program, comprising:

means for selecting combinations of said rearming aircraft, said aircraft to be rearmed, and said munitions;

means for storing and accessing said selected combinations in a database;

means for determining the quantity, availability, and compatibility of said rearming aircraft, said aircraft to be rearmed and said munitions; and means for displaying said means for selecting, said means for storing and accessing, and said means for determining.

7. Apparatus of claim 6, wherein said first interactive computer program cooperates with a centralized database.

8. Apparatus of claim 7, wherein said centralized database is selected from the group consisting of: an Air Tasking Order (ATO) and a Theater Battle Management Core System (TBMCS).

9. Apparatus of claim 7, wherein said first interactive computer program cooperates with said centralized database in real-time.

10. Apparatus of claim 5, further comprising:

a second interactive computer program, comprising means for guiding the transfer of said munition from said rearming aircraft to said aircraft to be rearmed;

means for determining and indicating the spatial orientation of said munition during said transfer; and means for determining and indicating the status of said transferred munition.

11. Means for guiding as in claim 10, further comprising:

means for displaying the relative orientation of said first sensor to said second sensor; and means for operator to correctly position said boom based on said displayed relative orientation.

12. Means for determining and indicating the spatial orientation of said munition as in claim 10, further comprising:

means for determining and indicating the azimuth angle, elevation angle and yaw angle of said weapons platform; and means for determining and indicating the distance between said weapons platform to said weapons mount.

13. Means for determining and indicating the status of said transferred munition as in claim 10, further comprising:

means for determining and indicating whether or not said munition is "docked";

means for determining and indicating whether or not said munition is "hooked"; and means for determining and indicating whether or not said munition is "armed".

14. Apparatus as in claim 10, wherein said means for guiding the transfer, said means for indicating the spatial orientation, and said means for indicating the status further comprise an interactive computer display for viewing the same by an operator.

15. Means for the direct release of a munition from a rearming aircraft, comprising:

a boom, said boom being attachable to and extendible from said rearming aircraft;

a conveyor attached to said boom, wherein said conveyor conveys said munition from said rearming aircraft to end of said boom;

means for providing aerodynamic lift to said boom; and a plurality of calipers for holding said munition to said conveyor, until said calipers are commanded to release said munition.

* * * * *